United States Patent [19]

Borgelt et al.

[11] Patent Number: 5,398,285
[45] Date of Patent: Mar. 14, 1995

[54] METHOD FOR GENERATING A PASSWORD USING PUBLIC KEY CRYPTOGRAPHY

[75] Inventors: Kenneth B. Borgelt, Rolling Meadows; Glenn N. Mayer, Elgin, both of Ill.

[73] Assignee: Motorola, Inc., Schaumburg, Ill.

[21] Appl. No.: 175,467

[22] Filed: Dec. 30, 1993

[51] Int. Cl.⁶ .............................................. H04K 1/00
[52] U.S. Cl. ........................................ 380/30; 380/4; 380/21; 380/25
[58] Field of Search ...................... 380/30, 23, 21, 25, 380/28, 4

[56] References Cited

U.S. PATENT DOCUMENTS

| 4,386,233 | 5/1983 | Smid et al. | 380/30 |
| 4,949,379 | 8/1990 | Cordell | 380/30 |
| 5,241,599 | 8/1993 | Bellovin et al. | 380/30 |

Primary Examiner—David C. Cain
Attorney, Agent, or Firm—Timothy W. Markison; James A. Coffing

[57] ABSTRACT

In a communication system, a password that enables an embedded software program within a base station can be generated using public key cryptography in the following manner. A system controller (103) obtains a unique identification code and an embedded software code for the base station (101). Once obtained, the system controller (103) encrypts the unique identification code and the embedded software code using a private key to produce a password. The password is transferred to the base station (101) where, upon receipt, is decrypted using a public key to produce the unique identification code and the embedded software code. The base station (101) compares the unique identification code and an embedded unique identification code (107) and, when they substantially match, the base station (101) stores the password.

16 Claims, 1 Drawing Sheet

METHOD FOR GENERATING A PASSWORD USING PUBLIC KEY CRYPTOGRAPHY

FIELD OF THE INVENTION

This invention generally relates to communication systems and, in particular, to generating a password using public key cryptography for devices within a communication system.

BACKGROUND OF THE INVENTION

Communication systems are known to comprise a plurality of communication units, base stations, and managing terminals, i.e., system controllers. Typically, the base stations and communication units, i.e., communication devices, contain all the software necessary to perform several functions or features of the communication system such as trunking, secure operations, etc. Enabling the necessary software is done by a system controller which may be coupled to the communication device via a modem.

In prior art communication devices, embedded software programs functioned only when the proper hardware was present in the communication device or communication system. As technology advances, communication devices are becoming "plug in boxes" comprising all the hardware and embedded software programs necessary to perform all the required functions and features of the communication system.

Having to build only one type of communication device (for example, base stations or communication units) aids in the manufacturing process, in that opportunities for errors are reduced over building many types of communication devices with different features. With one base station able to perform all functions, a base station becomes an "off the shelf product." To remain affordable and flexible, it is desirable to devise a way to "program" the "off the shelf" communication device to operate with specific functions or features as purchased by a customer. In this manner, customers pay only for the functions or features required for the functionality of their communication system.

To provide customers with only the software functions and features purchased, a method of enabling purchased functions and features while disabling functions and features not purchased is required. In prior art communication systems, this is typically accomplished by using a password to enable premium features within the communication device. This provides some level of protection, however, the same password is used for each communication device which is not difficult to obtain using today's technology. For example, the password may be determined by reading a memory location within the communication device or merely tapping into a communication link. In this manner, a communication device could be upgraded to perform unauthorized premium features with the illicitly obtained password. This easy access to the password results in lost revenue for the manufacturer.

For greater protection, the password may be encrypted and loaded into the communication device where the password is decrypted to determine which features are enabled. In this method, the encryption/decryption schemes used to encrypt/decrypt the password are usually inverse functions of each other. Since the decryption device resides inside the communication device, which is easily accessible, the communication device could be examined, and the encryption/decryption scheme could be discovered. Once the encryption/decryption scheme is discovered, a password could easily be generated, encrypted, and uploaded to a communication device to enable unauthorized premium features. Again resulting in lost revenues for the manufacturer.

Therefore, a need exists for a method utilizing a password that is not easily obtainable, to enable only those software functions and features that a particular customer has purchased and is authorized to use for the functionality of their specific communication system.

DESCRIPTION OF A PREFERRED EMBODIMENT

Generally, the present invention provides a method for using public key cryptography to generate a password that enables an embedded software program within a communication device. Public key cryptography algorithms provide sender authenticity (commonly known as digital signature) and data security but not both at the same time. When using the digital signature aspect of public key cryptography, the decryption algorithm (sender's public decryption key) is derived from the encryption algorithm (sender's private encryption key), but it is computationally difficult to derive the encryption algorithm from the decryption algorithm. Since the private key (encryption algorithm) is kept private, the recipient knows that a received message that decodes properly using the public key (decryption algorithm) could only have come from the authentic sender. When using the data security aspect of public key cryptography, the encryption algorithm (recipient's public encryption key) is derived from the decryption algorithm (recipient's private decryption key), but it is computationally difficult to derive the decryption algorithm from the encryption algorithm. Since the private key (decryption algorithm) is kept private, the recipient knows that a message received using the public key (encryption algorithm) can only be decrypted by the recipient using the private key (decryption algorithm) and cannot be decoded by third parties. In this manner, the recipient can decode the message but cannot be certain of where the message came from since the encryption key is public. More information regarding public key cryptography can be found in an article in "Trends in Computing," August 1979 issue entitled "The Mathematics of Public-Key Cryptography".

The present invention utilizes the "Digital Signature" attribute of public key algorithms to insure that a communication system's software is able to determine that a password could only have originated from a legitimate source. The public key cryptographic system insures that a customer cannot use knowledge gained by analyzing a single communication device to create passwords for other communication devices. Since a unique and unalterable hardware identification number in the communication device is referenced in the password, this insures that a password can only enable one specific communication device. A password is determined to be genuine when the password provides the digital signature and the decoded password references the proper unique hardware identification number for that communication device. With such a method, unauthorized software features cannot be enabled within a communication device unless a legitimate password generated by a valid source is received.

Figure 1:
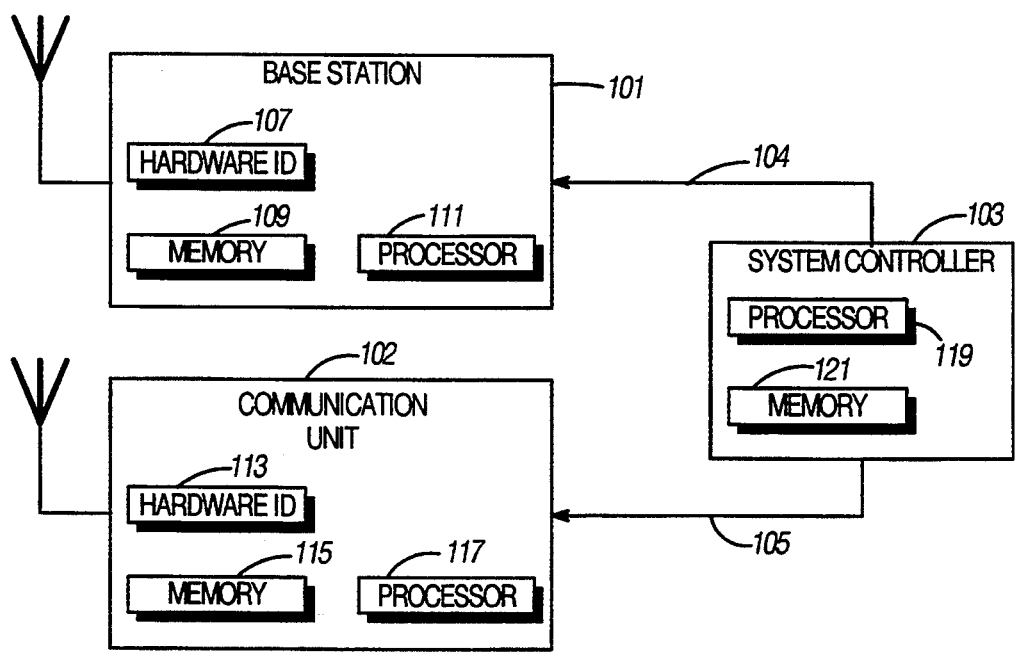
FIG. 1 illustrates a communication system in accordance with the present invention.

The present invention can be more fully described with reference to FIGS. 1 and 2. FIG. 1 illustrates a communication system comprising a base station (101), a communication unit (102), and a system controller (103). The base station (101) comprises a unique identification code (107), memory (109), and a processor (111). The communication unit (102) comprises a unique identification code (113), memory (115), and a processor (117). The system controller (103) comprises a processor (119) and memory (121). The system controller (103) programs the base station (101) via a communication link (104) and programs the communication unit (102) via a second communication link (105).

The base station (101), which may be a QUANTAR ™ Base Station manufactured by Motorola, modulates voice onto a radio frequency carder. The communication unit (102) may be a portable or mobile unit, such as a RADIUS GP300 ™ or a MAXTRAC ™, both manufactured by Motorola. The system controller (103) may be an HP700 workstation controlling the manufacture of Quantar Base Stations. The communication links (104 and 105) are typically RS-232 links, but may be wireline links with modems or even wireless or RF (radio frequency) links for use with remote sites.

The unique identification code (107 and 113) is a hardware determined identification number guaranteed to be unique, which may be implemented as a DS2400 Silicon Serial Number manufactured by Dallas Semiconductor. Memory (109) may be DRAM (dynamic random access memory) or EEPROM (electrically erasable programmable read only memory). The processor (111) controls the base station (101) and may be a 68302 processor as manufactured by Motorola. Memory (115) may be RAM, SRAM (static random access memory), DRAM, or EEPROM. The processor (117) controls the communication unit (102) and may be a 68302 or a 68HC11 as manufactured by Motorola. The processor (119) within the system controller (103) may be a 68302 processor as manufactured by Motorola. The system controller (103) is typically a purchased workstation such as the HP700 as manufactured by Hewlett Packard. Memory (121) may be RAM or Disc memory.

Consider the following as an example of using public key cryptography within a communication system to provide sender authenticity, commonly known as a digital signature. A password for enabling an embedded software program within the base station (101) is generated by the system controller (103) using a private encryption key utilizing the base station hardware ID (107) and an embedded software code corresponding to the purchased features for the base station (101). In one preferred embodiment, the embedded software code may be a feature mask that contains a single bit for every available feature. If the bit corresponding to a feature is set, the customer is authorized to use that particular feature. Once the password is generated, it is transported to the base station (101) via the communication link (104). Upon receipt, the base station (101) decrypts the password using a public decryption key that corresponds to the private key used by the system controller (103) to generate the password. Since the password decodes properly and the private key is kept private, the base station (101) determines that the password could only have come from the system controller (103).

Figure 2:
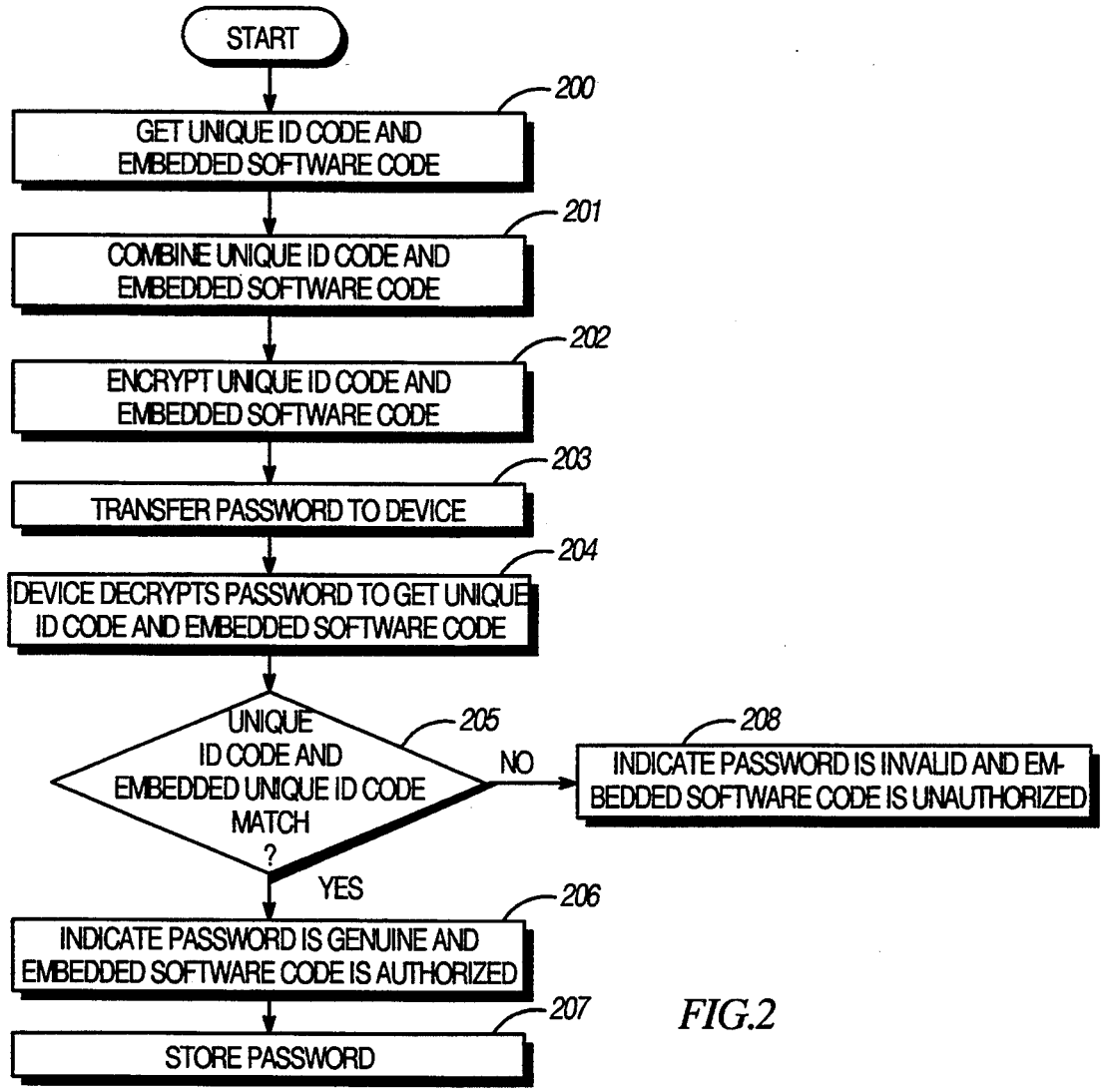
FIG. 2 illustrates a logic diagram that a communication device and a system controller may use to implement the present invention.

FIG. 2 illustrates a logic diagram that a communication device and a system controller may use to implement the present invention. At step 200, the system controller obtains a hardware ID and a software code for the communication device. The hardware ID is a number that is unique to a particular communication device, such as a base station (101). This may be done by placing a part similar to the Dallas Semiconductor DS2400 in the communication device. The DS2400 device contains a 48 bit unique number that can be read by a microprocessor. The hardware ID may be read from the communication device during manufacture and recorded in a database for later use in creating a password for the communication device. As mentioned above, the embedded software code may be a feature mask that contains a single bit for every available feature. The embedded software code may also contain other fields such as a software version number. This would prevent a customer from executing later or newer versions of software than that which was purchased. The information needed to create the embedded software code may be obtained from a customer order form.

After the hardware ID and the embedded software code are obtained (200), they are combined into a single new code (201). This combination may be a concatenation of the two. A second method of combining the hardware ID and the embedded software code may be to add a checksum to the embedded software code and exclusive-OR the result with the hardware ID. Whatever method of combining the two is used, the hardware ID and the original embedded software code must be able to be retrieved from the combination and able to identify valid embedded software codes. For example, if the hardware ID is exclusive-OR'ed with the embedded software code without a checksum, the result could be decoded using a different hardware ID and there would be no way to verify that the resulting embedded software code was invalid.

After producing the new code (combination of the hardware ID and the embedded software code), the system controller encrypts the new code using a private encryption key (202). The result is a customer password for the particular communication device. Since creating the password requires the private key, and the private key is kept private, i.e., does not leave the factory (system controller), customers are prohibited from generating passwords for any communication device. The password is then transferred to the communication device (203). While in the factory, this may take place over an RS-232 link from the system controller to the communication device. If for some reason the password is lost while the communication device is in the field, the password may be reloaded using the same equipment that is used to program other parameters, such as frequencies, for example, a Radio Service Software (RSS) terminal. The password may also be sent over a wireless link. The possibility of someone intercepting the password being sent over the wireless link is not cause for concern since the password is only of use to a particular communication device.

Upon a predetermined condition, such as, receipt of the password or reset, the communication device decrypts the password using a public decryption key to obtain the hardware ID and the embedded software code (204). The hardware ID is compared to an embedded hardware ID (205) within the communication device. If the combined code is a concatenation of the embedded software code and the hardware ID, the comparison is a bit by bit comparison. If a checksummed embedded software code was exclusive-OR'ed with the hardware ID, the comparison is a two step process. First the password is exclusive-OR'ed with the hardware ID and then the checksum is verified for validity. If the checksum is incorrect, this indicates that the hardware ID is invalid for the particular communication device.

If the hardware ID matches the embedded hardware ID for the particular communication device (205), the communication device indicates that the password came from an authentic source and the embedded software code is authorized (206). Thus, the software programs that are encoded into the embedded software code are then enabled in the communication device. The communication device may indicate that a valid password was received by sending a message or an acknowledgment via a wireline or wireless communication link to the device (RSS terminal or system controller) that transferred the password to the communication device. The password is then stored in the communication device (207) for future use. Every time the communication device is reset, the password verification process (steps 204–208) may be repeated using the stored password. It may be desirable to have the communication device store more than one password so that a customer may have multiple passwords that enable different embedded programs.

If the hardware ID and the embedded hardware ID do not match (205), the communication device indicates that the password is invalid and that the embedded software code is unauthorized (208). At this point the communication device indicates that an invalid password was received. The communication device may also indicate that none of the protected software programs are available and that only basic operation is allowed.

The password for a particular communication device may also be updated to modify enabled software features once the communication device has left the factory and is out in the field. To accomplish this, the system controller generates a password (steps 200–202) and either transfer it to the communication device via a communication link as explained above, or the password may be given to a customer or a field technician who would load the password into the communication device via a RSS terminal where the process would continue at step 204.

The present invention provides a method for using public key cryptography to generate a password that enables an embedded software program within a communication device. By using public key cryptography, enablement of software features by unauthorized means is prohibited due to an authentic password being required. As communication devices move towards premium features being implemented in software, the present invention prevents the loss of revenues by authorizing only those software programs legitimately purchased by a customer.

We claim:

1. In a communication system, a method for using public key cryptography to generate a password that enables an embedded software program within a base station, the method comprises the steps of:
   a) obtaining, by a system controller, a unique identification code for the base station and an embedded software code;
   b) encrypting, by the system controller, the unique identification code and the embedded software code, via a private key, to produce the password;
   c) transferring, by the system controller, the password to the base station;
   d) upon receiving the password, decrypting, by the base station via a public key, the password to produce the unique identification code and the embedded software code;
   e) comparing, by the base station, the unique identification code with an embedded unique identification code; and
   f) when the unique identification code and the embedded unique identification code substantially match, storing, by the base station, the password.

2. The method of claim 1 further comprises the step of, when the unique identification code and the embedded unique identification code do not substantially match, indicating, by the base station, that the unique identification code and the embedded unique identification code do not substantially match.

3. The method of claim 1 further comprises, prior to the encryption of step (b), combining the embedded software code and the unique identification code.

4. In the method of claim 3, the combination of the embedded software code and the unique identification code further comprises concatenating the embedded software code and the unique identification code.

5. In the method of claim 3, the combination of the embedded software code and the unique identification code further comprises exclusive OR'ing the embedded software code and the unique identification code.

6. In the method of claim 1, step (c) further comprises transferring the password via a wireless communication link.

7. In the method of claim 1, step (c) further comprises transferring the password via a wireline communication link.

8. In the method of claim 1, the storage of the password of step (f) further comprises storing the password in a table, wherein the table comprises a list of previous passwords.

9. In a base station that includes a plurality of embedded software programs and an embedded unique identification code, a method for using public key cryptography to verify a password is from a valid source, wherein the password enables at least one embedded software program of the plurality of embedded software programs, the method comprises the steps of:
   a) upon a predetermined condition, decrypting, via a public key, the password to produce a unique identification code and an embedded software code;
   b) comparing, the unique identification code with the embedded unique identification code; and
   c) when the unique identification code and the embedded unique identification code substantially match, indicating that the password is genuine and the embedded software code is authorized.

10. The method of claim 9 further comprises the step of, when the unique identification code and the embedded unique identification code do not substantially match, indicating that the password is not genuine and the embedded software code is unauthorized.

11. A method for generating a password by using public key cryptography, wherein the public key cryptography comprises a private key, the method comprises the steps of:
   a) obtaining an embedded unique identification code and an embedded software code; and
   b) encrypting the unique identification code and the embedded software code, via the private key, to produce the password.

12. The method of claim 11 further comprises, prior to the encryption of step (b), combining the embedded software code and the embedded unique identification code.

13. In the method of claim 12, the combination of the embedded software code and the unique identification code further comprises concatenating the embedded software code and the unique identification code.

14. In the method of claim 12, the combination of the embedded software code and the unique identification code further comprises exclusive OR'ing the embedded software code and the unique identification code.

15. In a communication unit that includes a plurality of embedded software programs and an embedded unique identification code, a method for using public key cryptography to verify a password is from a valid source, wherein the password enables at least one embedded software program of the plurality of embedded software programs, the method comprises the steps of:
   a) upon a predetermined condition, decrypting, via a public key, the password to produce a unique identification code and an embedded software code;
   b) comparing, the unique identification code with the embedded unique identification code; and
   c) when the unique identification code and the embedded unique identification code substantially match, indicating that the password is genuine and the embedded software code is authorized.

16. The method of claim 15 further comprises the step of, when the unique identification code and the embedded unique identification code do not substantially match, indicating that the password is not genuine and the embedded software code is unauthorized.

* * * * *